(12) United States Patent
Shimoda et al.

(10) Patent No.: US 6,195,415 B1
(45) Date of Patent: Feb. 27, 2001

(54) COMMUNICATION LINE TEST APPARATUS FOR A MOBILE RADIO SYSTEM

(75) Inventors: Makoto Shimoda, Coppell; Farhad Esfahani, Arlington, both of TX (US)

(73) Assignee: Uniden America Corporation, Ft. Worth, TX (US)

( * ) Notice: Subject to any disclaimer, the term of this patent is extended or adjusted under 35 U.S.C. 154(b) by 0 days.

(21) Appl. No.: 09/123,214

(22) Filed: Jul. 27, 1998

(51) Int. Cl.[7] .............................. H04M 1/24; H04M 3/08; H04M 3/22

(52) U.S. Cl. ...................................... 379/22; 379/5; 379/6

(58) Field of Search ........................... 370/242, 247–248, 370/251; 379/1, 4–6, 9, 10, 12, 14, 15, 16–17, 22–29, 30–32, 34

(56) References Cited

U.S. PATENT DOCUMENTS

| 5,040,237 | 8/1991 | Barnes et al. ............................. 455/8 |
| 5,159,701 | 10/1992 | Barnes et al. ........................... 455/15 |
| 5,203,015 | 4/1993 | George ................................ 455/34.1 |
| 5,214,789 | 5/1993 | George ................................ 455/33.2 |
| 5,353,326 | * 10/1994 | Jung ........................................... 379/6 |
| 5,440,759 | 8/1995 | Barnes et al. ........................... 455/15 |
| 5,465,386 | 11/1995 | Barnes et al. ........................... 455/15 |
| 5,497,508 | 3/1996 | George ............................... 455/161.2 |
| 5,517,677 | 5/1996 | Moon .................................. 455/161.2 |
| 5,548,802 | 8/1996 | Barnes et al. ........................... 455/15 |
| 5,613,196 | 3/1997 | Barnes et al. ........................... 455/15 |
| 5,613,201 | 3/1997 | Alford et al. ......................... 455/331 |
| 5,634,196 | 5/1997 | Alford ................................. 455/54.2 |
| 5,815,799 | 9/1998 | Barnes et al. ........................... 455/15 |
| 5,835,565 | * 11/1998 | Smith et al. ............................. 379/5 |
| 6,005,921 | * 12/1999 | Keefe et al. ............................ 379/27 |

* cited by examiner

*Primary Examiner*—Duc Nguyen
(74) *Attorney, Agent, or Firm*—Sidley & Austin

(57) ABSTRACT

A mobile radio communication network including plural radio cells controlled by a centralized hub controller. The hub controller communicates data packets to each radio cell on a data line, and bridges together appropriate audio lines to provide dispatch communications between the radio cells. The hub controller is programmed to carry out tests on each data line and each audio line to verify off-hook conditions thereof so that uninterrupted data signals and audio signals can be carried.

14 Claims, 3 Drawing Sheets

COMMUNICATION LINE TEST APPARATUS FOR A MOBILE RADIO SYSTEM

RELATED APPLICATION

U.S. patent application Ser. No. 08/743,471, filed Nov. 4, 1996, titled "Trunked Multi-Site Dispatch Network for Trunking Radios", the entire discourse of which is incorporated herein by reference.

TECHNICAL FIELD OF THE INVENTION

The present invention relates in general to line test apparatus and techniques, and more particularly to a technique for assuring telephone line connections between a mobile radio hub and plural cell switches.

BACKGROUND OF THE INVENTION

Many types of communications between locations rely on the use of the public switched telephone network (PSTN). The most typical use of the telephone network is the dial-up of a directory number to establish a talking path between the originating station and a destination station, whereupon the telephone line remains busy for as long as the audio or data signals are carried. After the communication is terminated, both stations go on-hook and the telephone line is idled.

There exist other systems, some of which are utilized in mobile radio communications, in which the public switched telephone network is utilized to provide both data and audio communications between plural cell switching systems and a centralized hub controller. In this type of environment, the communications are of the dispatch type, or better known as push-to-talk (PTT). Each time a mobile radio is keyed, an idle radio channel is selected and the originating party may typically speak for several seconds, in which event the audio signals are transmitted via the mobile radio antenna to a local cell switching system. The cell switching system then transmits the dispatch radio signals to other mobile radios in the radio transmission area, and also transmits the audio signals via a telephone line through the PSTN to the hub controller. Based on the group to which the originating mobile radio is assigned, the hub controller bridges the telephone line to the corresponding telephone lines of yet other cell switching systems so that all the mobile radios assigned to the group can receive the audio signals. In this manner, the other cell switching systems that are located outside the radio transmission range of the transmitting cell can nevertheless receive the audio portion of the dispatch communications. Even though the communications between the various mobile radios may only be a few seconds each, the telephone lines interconnecting the cell switches to the hub controller are always "off-hook", thereby remaining ready to carry any of the dispatch audio signals. It can be appreciated that if a telephone line had to be dialed and established for each communication, the delay period would be unacceptable and the bidirectional communication of audio signals would be extremely cumbersome and burdensome.

Many mobile radio systems are configured so that one data line, which is typically a telephone line carrying modem signals, is coupled between each cell switch and the hub controller. Associated with each data line are one or more telephone lines for carrying the audio dispatch communications. Depending upon the configuration of the system, the telephone lines can be idled, if not used within a period of several minutes. In such a system, during periods of low usage, at least one audio line will always remain active, and the remaining audio lines may be automatically disabled, but reactivated should the dispatch traffic increase to a level such that one audio line cannot handle the traffic conditions without encountering significant delays.

While the public switched telephone network is generally a reliable medium of carrying either audio or data signals, service interruptions are known to occur. The reliability of telephone switching systems is generally a function of the quality of the systems, the age and type of technology employed, as well as the maintenance of the equipment and lines and often the weather or environmental conditions in which the equipment and lines are required to operate. The reliability of telephone switching systems is vastly different in different countries. For example, in the United States and many other highly developed and industrialized countries, the telephone switching systems are very reliable and taken for granted by the public. In many other countries, the telephone switching systems are themselves old and constructed with old technology, are poorly maintained, and thus interruptions in service are frequent.

Telephone communications can be interrupted for various reasons including inadvertent on-hook conditions by the telephone systems, substantial line static or cross-talk, insufficient loop current, audio cut-off, inadequate or lack of line signaling, circuit failures in the line cards, erratic cross-connections in the switching fabric, physical telephone line crosses or breakage and a host of other problems. It can be appreciated that if a telephone line is immediately required to carry audio or data signals, a service disruption is not only annoying, but can cause substantial delays in the reestablishment of the communication path. Also, if data is being transmitted over the telephone line, then an interruption in service will often require a retransmission of the entire string of data. While one solution to the problem of inadequate communication service is the overall improvement of the public-switched telephone network, such a solution is often too expensive to consider. Also, while maintenance and routine testing can serve to improve the quality of communication services, this solution may also be inadequate and expensive for old and unreliable systems.

From the foregoing, it can be seen that a need exists for a technique to minimize the interruption in service between telephone line users of a public-switched telephone network. Another need exists for methods and apparatus for maintaining a telephone line in an off-hook status, especially if some of the lines are prone to failure. Yet another need exists for a rather inexpensive method of testing the telephone lines to assure an operational status thereof between the periods of usage. Yet another need exists for a line test that is carried out at predefined times to minimize interruption of service should the line be defective.

SUMMARY OF THE INVENTION

In accordance with a preferred embodiment of the invention, signals are periodically transmitted on both the voice and data lines connecting the radio cells together to thereby verify the operability of the lines. First, the hub transmits on the telephone digital line a data packet identifying the initiation of a test itself, as well as an identity of the telephone audio line to be tested. If the line is deemed faulty it will not be used on the next dispatch call, but another existing connection will be employed. Since the hub controller is the master device in selecting which audio line of the network is to be used for dispatch communications, an idle audio line is selected by the hub controller for testing. After the data packet is transmitted by the hub controller to a cell switching system, a specific set of DTMF signals is transmitted on the audio line to be tested.

The radio cell receiving the data packet will decode the same and acknowledge receipt thereof by a transmission on the data line of an acknowledgment data packet. In addition, the radio cell receives the DTMF signals on the audio line, decodes such signals to determine the corresponding digits of the particular set of DTMF signals. The radio cell then transmits on the same audio line back to the hub controller the same set of DTMF signals, which signals are received, decoded and verified at the hub controller. In this manner, the audio line can be tested in both directions to verify that the line is indeed off-hook, and is of acceptable quality to carry on dispatch-type communications. In addition, by virtue of the transmission of the data packet by the hub controller, and the receipt of acknowledgment, the data line is also tested and verified as to its operability.

In the event that the hub controller does not receive back a data packet acknowledgment from the radio cell, or any DTMF signals, it can be assumed that the data line is on-hook or otherwise inoperable. In such an event, the hub controller attempts to reestablish a dial-up data line connection to the radio cell on which modem signals can be transmitted. If, on the other hand, the hub controller receives an acknowledgment data packet from the radio cell on the data line, but no return DTMF signals from the radio cell on the audio line, it can be assumed that the audio line is down or sufficiently degraded so as to be unable to carry audio signals. In this event, the hub controller attempts to reestablish the audio line by dial-up thereof, as well as the transmission of appropriate data packets.

The hub controller is programmed to carry out the data line and audio line tests periodically to assure continued, uninterrupted operation. Indeed, after each dekey operation of a mobile radio, i.e., when the push-to-talk button is released, the hub controller automatically carries out a test on the line last utilized by the dispatch communication. By testing each communication line in this manner, no more than one dispatch communication will be lost due to a faulty line, and the detection thereof Notwithstanding the line test following each dekey of a mobile radio, the hub controller is programmed to carry out a line test on a periodic basis, such as every ten seconds. Thus, even though a line may be idle, it is periodically tested to verify that it is operable so that when needed, the line will be instantly available for carrying communication signals between the hub controller and the various radio cells.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts or elements throughout the views, and in which.

DETAILED DESCRIPTION OF THE INVENTION

Figure 1:
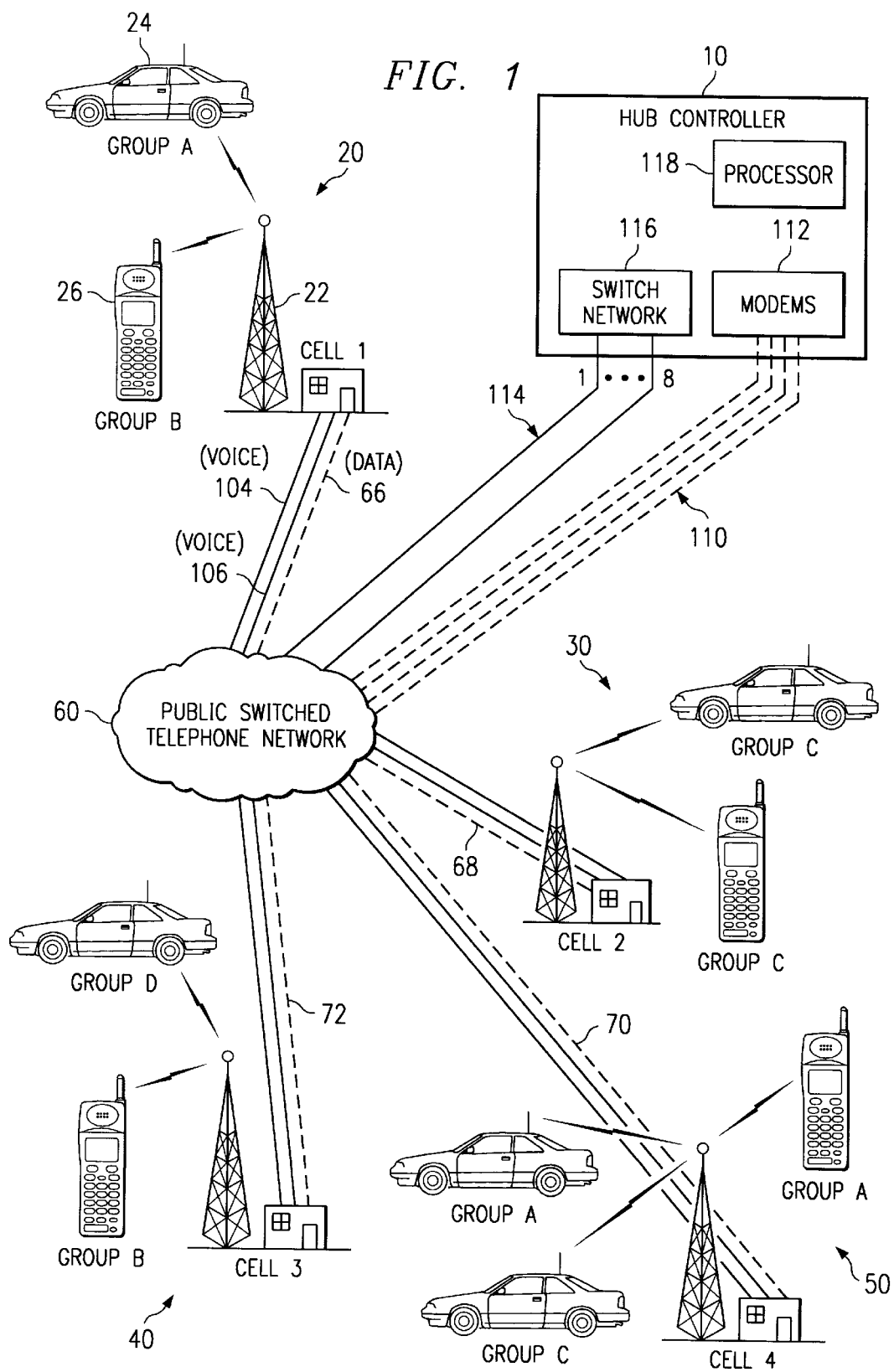
FIG. 1 is a generalized block diagram of a mobile radio network having a plurality of radio cells controlled by a hub controller, and all connected together via the public switched telephone network.

Set forth below is a generalized description of an environment in which the invention is ideally suited for operation, it being understood that many other applications are possible. In accordance with the preferred embodiment of the invention, there is illustrated in FIG. 1 a number of radio cells networked together to provide dispatch-type of radio communications. The area of communications coverage constitutes the composite of the area serviced by the individual radio cells. According to the preferred form of the invention, a hub controller 10 coordinates the dispatch communications transferred between each of the radio cells. According to the network configuration shown in FIG. 1, each radio cell, for example, cell 1 identified by reference numeral 20, includes the conventional equipment such as a transmit-receive antenna 22, radio transceivers of one or more groups, such as group A identified by reference numeral 24 and group B identified by reference numeral 26, as well as other groups (not shown). In the preferred embodiment, there may be as many as 255 different groups associated with each radio cell. The mobile radios may be of different varieties, including vehicle mounted, handheld units, etc. In FIG. 1, there is shown the typical situation where a group of mobile radios, such as Group A, includes radios that are associated with different cell switching systems. For example, Group A radios are shown associated with radio cells 20 and 50. Because the radio cells 20 and 50 are geographically remote from each other such that free space transmission signals cannot maintain the radios in direct communications, the telephone lines and the public switched telephone network 60 provide the transmission medium for the dispatch communications of the groups. The radio cell 20 includes conventional radio equipment adapted for trunking a number of repeaters to provide push-to-talk communications between the radio transceivers of a group. While not shown, the radio cell 20 may include additional equipment for carrying out full-duplex communications, etc. The other radio cells, such as cell 30, cell 40 and cell 50 are also similarly equipped.

Each radio cell is connected via the public switched telephone network 60 by way of respective data lines 66–72 to a hub controller 10. The data lines are shown with broken lines to distinguish them from the audio lines. Only a single data line per radio cell is necessary for connection to the PSTN 60 for carrying data signals in the nature of data packets. Each data line 66–72 can be a standard telephone line for carrying modem-generated data signals at a data rate of at least 9600 bits per second. In addition to a data line, each radio cell is connected via the public switched telephone network 60 to the hub controller 10 by one or more telephone voice lines, such as voice lines 104 and 106 that connect the respective voice ports of the first radio cell 20 to the public switched telephone network 60. Each radio cell is not required to have the same number of telephone voice lines as the other cells in the network. Rather, the number of telephone voice lines needed is largely a matter of the radio traffic encountered by the individual radio cells. Where a radio cell has a large amount of dispatch-type of communication traffic, such cell will naturally be provided with more telephone voice lines than another cell in the network that experiences less dispatch-type of communications traffic. In the detailed description of the invention which follows, it will be assumed that each radio cell is structured to operate with the Enhanced Sub-Audible Signaling (ESAS) protocol described in the specifications X-WP-0004G-2/93 and ESAS-0046-ARX-3100_MSD. However, the principles and concepts of the invention are equally applicable to other types of communications systems operating with different protocols.

The hub controller 10 is connected to the public switched telephone network 60 by way of plural data lines 110.

Indeed, in the preferred form of the invention, there is one data line of the group 110 for each radio cell connected as a network. In view that there are four radio cells shown in the example in FIG. 1, there is a group of four corresponding data lines 110 connecting the hub controller 10 to the PSTN 60. Each data line 110 is connected to a respective modem 112 of the hub controller 10. The modems 112 of the hub controller 10 are preferably of the same speed as the corresponding modems (not shown) that connect each cell data line to the processor of the radio cell.

The hub controller 10 also includes plural telephone voice lines 114 connected to the PSTN 60. In the preferred form of the invention, for each telephone voice line connecting a radio cell to the PSTN 60, there is a corresponding telephone voice line 114 connecting the PSTN 60 to the hub controller 10. In the example show in FIG. 1, since each of the four radio cells has two telephone voice lines connected to the PSTN 60, the hub controller 10 includes at least eight telephone voice lines 114 connected to the PSTN 60. With this arrangement, eight simultaneous dispatch communications can be handled. Each telephone voice line 114 of the hub controller 10 is connected to an NxN switching network 116 for connecting any one of the telephone voice lines 114 to any of the other telephone voice lines thereof In the preferred form of the invention, the switching network 116 is of the type adapted for connecting one incoming telephone voice line 114 to plural outgoing telephone lines 114 to provide a broadcast capability of voice signals. One dispatch transmission can thus be heard by plural mobile radios belonging to the particular group and located throughout the network. Switching networks 116 of such type are conventionally available with AG8 printed circuit cards obtainable from Natural Microsystems. In such types of circuits, the analog voice signals are converted to corresponding digital signals, switched to the desired output lines, and then reconverted to analog signals for transmission on the desired output lines directed to the PSTN 60. Other types of conventionally available switching networks can function with equal effectiveness.

The hub controller 10 also includes a program-controlled processor 118 that is programmed to operate in several modes to coordinate dispatch-type of communications between the various radio cells. Indeed, the hub controller 10 can itself be any of the numerous conventionally available personal computers that can accommodate modems 112 and can support conventional circuit cards, such as the switch network 116, line interface cards, etc. The hub controller 10 is programmed to operate in various modes. In an initialization mode, the hub controller 10 sequentially communicates to each radio cell via a respective data line to establish each of the telephone voice lines in an operational off-hook condition. The off-hook condition can be maintained indefinitely, or for a programmed period of time, or placed in an on-hook condition after a predefined period of inactivity. When all of the telephone voice lines connected to each of the radio cells are off-hook, dispatch-type of voice signals can be passed from an originating radio cell and broadcast to plural destination radio cells, all under the control of the hub controller 10. Further, the push-to-talk commands, such as commands indicating the transceiver radio switch has either been pushed (keyed), or released (dekeyed), and other commands, can be passed between the respective radio cells and the hub controller 10. In this manner, the hub controller 10 functions as a master device in transferring the voice signals from one cell to the other cells via the PSTN 60. It should be noted also that as to each individual radio cell, it operates autonomously in providing transmit and receive signals between each of the transceivers served directly by such cell. However, when such signals are transferred to the other radio cells in the network, the hub controller 10 selects and bridges together the various telephone voice lines for transferral of the voice signals to be broadcast to the destination cells. The hub controller 10 is programmed with appropriate tables that identify each radio transceiver of a group, such that when one transceiver of the group transmits, all other transceivers of the group receive the communication, irrespective of which radio cell is presently serving the respective transceivers. To that end, the hub controller 10 essentially carries out a trunking function with regard to the telephone voice lines that connect each radio cell to the public switched telephone network 60.

The hub controller 10 generally operates in the initialization mode only when bringing the hub on line with regard to the radio cells. However, should a new radio cell be added subsequent to the initialization of the overall system, a portion of the initialization routine can be carried out to initialize the new radio cell. As will be described below, if a data line or voice line is placed on-hook for any reason, portions of the initialization routine can be executed to again place the lines off-hook and in an operational mode to carry information for dispatch communications.

Subsequent to the initialization mode, the hub controller 10 is placed in a conversation mode. In the conversation mode, the hub controller 10 detects data signals on the respective data lines indicating that a transceiver radio has been keyed in the vicinity of one radio cell. Idle telephone voice lines can then be selected by the hub controller 10 to couple the voice signals via the PSTN 60 to the other radio cells. As will be set forth more fully below, when the hub controller 10 receives a radio key command on a data line, idle telephone voice lines directed to the other radio cells are selected. Busy-idle tables of the voice lines are flagged and updated appropriately by the hub controller 10. When the hub controller 10 receives a dekey command, the respective telephone voice lines are then idled and can thereafter be used for servicing the transceiver key commands of other radios. The dekey commands of communication radios are processed in accordance with an end of transmission mode carried out by the hub controller 10. In this manner, the hub controller 10 allows the networking of dispatch type of radio communications amongst two or more radio cells. The various transmission protocols and formats, as well as the software routines of the hub controller 10 are described in detail in pending U.S. patent application Ser. No. 08/743, 471 filed Nov. 4, 1996.

While not shown, the data packets communicated between the hub controller 10 and the radio cells each include a one-byte start field to indicate the start of a data packet frame, a one-byte field identifying the type of communication, and a two-byte field identifying the length of a data field. The data field following the length field is of variable length, and includes a command field, and other fields that can identify a group I.D., a correlator number, index number, telephone number, etc. Following the data field is a two-byte field for error checking purposes, and lastly a one-byte field that identifies the end of the transmission frame.

The various command fields that are placed in the data field include a key, acknowledgment, negative acknowledgment, dekey, initialization, and telco index commands. The key command is transmitted in a data packet by a radio cell in response to a transceiver radio being keyed to transmit voice communications. In the data portion of the key command data field, there are four bytes of data allocated to the group identification of the group in which the transmitting radio is assigned. Two bytes of data are also included as an index field to identify a particular telephone voice line on which dispatched communications are to be carried out in response to the key command. Data is placed in the index field by the hub controller 10 to identify the particular telephone voice line that is going to be used.

An acknowledgment (ack) command also includes in the data field a group I.D. number and an index number. The acknowledgment command is transmitted by the hub controller 10 in response to receipt of a key command data packet, to acknowledge to the radio cell on the data line a receipt of the key command. The acknowledgment command is also transmitted by a radio cell after it has received both a test date packet on the data line and audio tones on the telephone voice line.

A negative acknowledgment (nak) is a command transmitted by a radio cell when it has received a test data packet from the hub controller, but has not received a corresponding set of audio tones. The nak command includes a group I.D. number, but no index field.

A dekey command is transmitted by a radio cell when the transmit button or switch of a transceiver is released. The dekey command includes a group I.D. field and an index field identifying the telephone line utilized. Receipt of a dekey command is effective to idle the voice line by the hub controller 10 and allow it to be subsequently used for a new key command.

The initialization (init) command includes a correlator number field assigned by the hub controller 10 to a particular radio cell during the initialization mode. The correlator field includes a random number generated by the hub controller 10. Also in the initialization command data field is a telphone number field containing the directory number assigned by the public switched telephone network to a telephone line connected to the hub controller 10. When the hub controller 10 transmits a frame of data to a radio cell over a data line, which has the initialization command therein, the radio cell is thereby assigned a unique correlator number in the correlator field, as well as a telephone directory number in the respective field. Thus, when a radio cell establishes a telephone connection to the hub controller 10, such connection can be established by the radio cell dialing the directory number that exists in the directory number field. In like manner, when the PSTN 60 applies ringing signals to the telephone line 114 assigned the telephone number in the telephone number field, the hub controller 10 can respond to the ringing and trip the same to establish an off-hook voice line between the particular radio cell and the hub controller 10.

Lastly, a telco index command includes an index field which again identifies the index number of a telephone voice line that is utilized by the particular radio cell. A correlator number field is utilized for carrying a correlator number assigned to the radio cell by the hub controller 10.

From the foregoing, it can be appreciated that every data transmission on the data line, such as line 66 in FIG. 1, incorporates a data packet with one of the six types of commands. The particular data fields utilized are based on the type of command which is assigned by either the processor in the radio cell, or the programmed processor 118 in the hub controller 10, depending on which processor is then in the modem transmitting mode.

Figure 2:
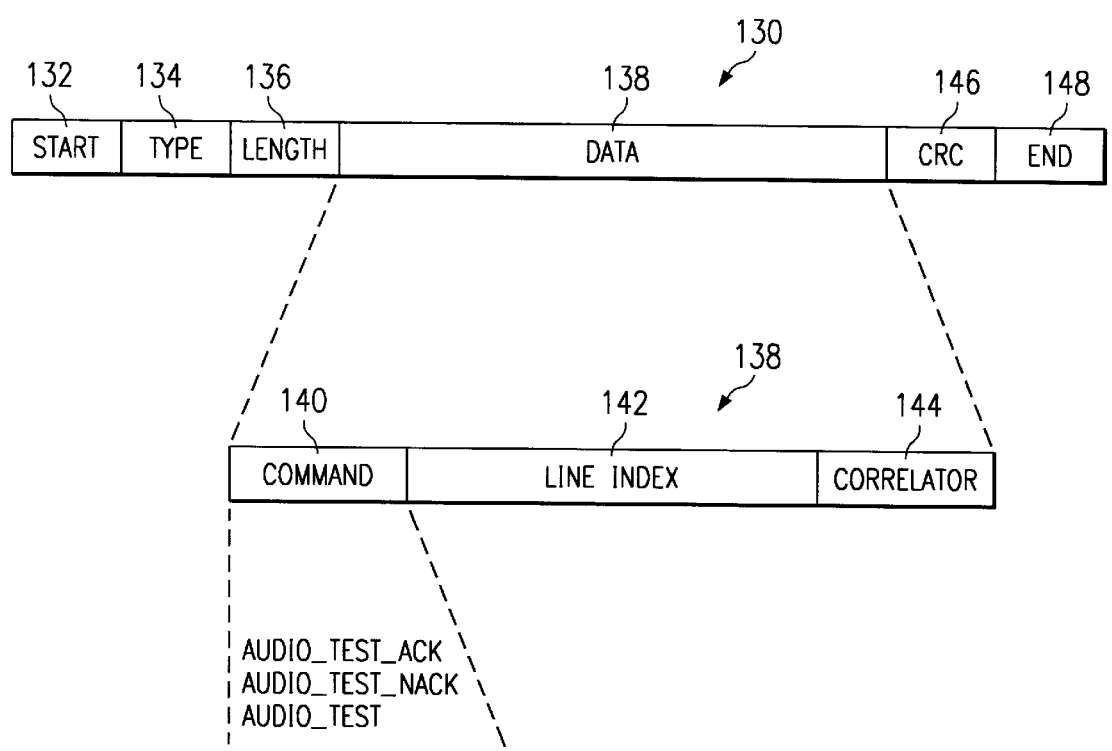
FIG. 2 is a diagram of a data packet protocol for communicating between the hub controller and radio cells for instituting a line test.

In accordance with the invention, a new command is utilized to initiate a test of the data and audio lines. A test command data packet 130 shown in FIG. 2 is employed to communicate with the radio cells to institute a test of the telephone lines therebetween and assure that such lines are off-hook and acceptable for use.

The audio test command data packet 130 includes many of the same fields described above, including a start field 132, a type field 134, a length field 136, as well as the data field 138. The data field 138 is shown in expanded form in FIG. 2 as a one-byte command 140, a two-byte line index field 142 and a one-byte correlator field 144. Lastly, the audio test command packet 130 includes an error checking field 146 and an end-field 148 signifying the end of the data packet. Three specific commands for testing the telephone lines of the PSTN for an off-hook condition are audio_test_ack; audio_test_nack; and audio_test. Different combinations of bits in the command field 140 identify these different audio test commands. The line index field 142, as described above, identifies the particular telephone line that is to be tested by the hub controller 10. The correlator field 144 is a unique number assigned by the hub controller 10 to the particular radio cell.

Figure 3:
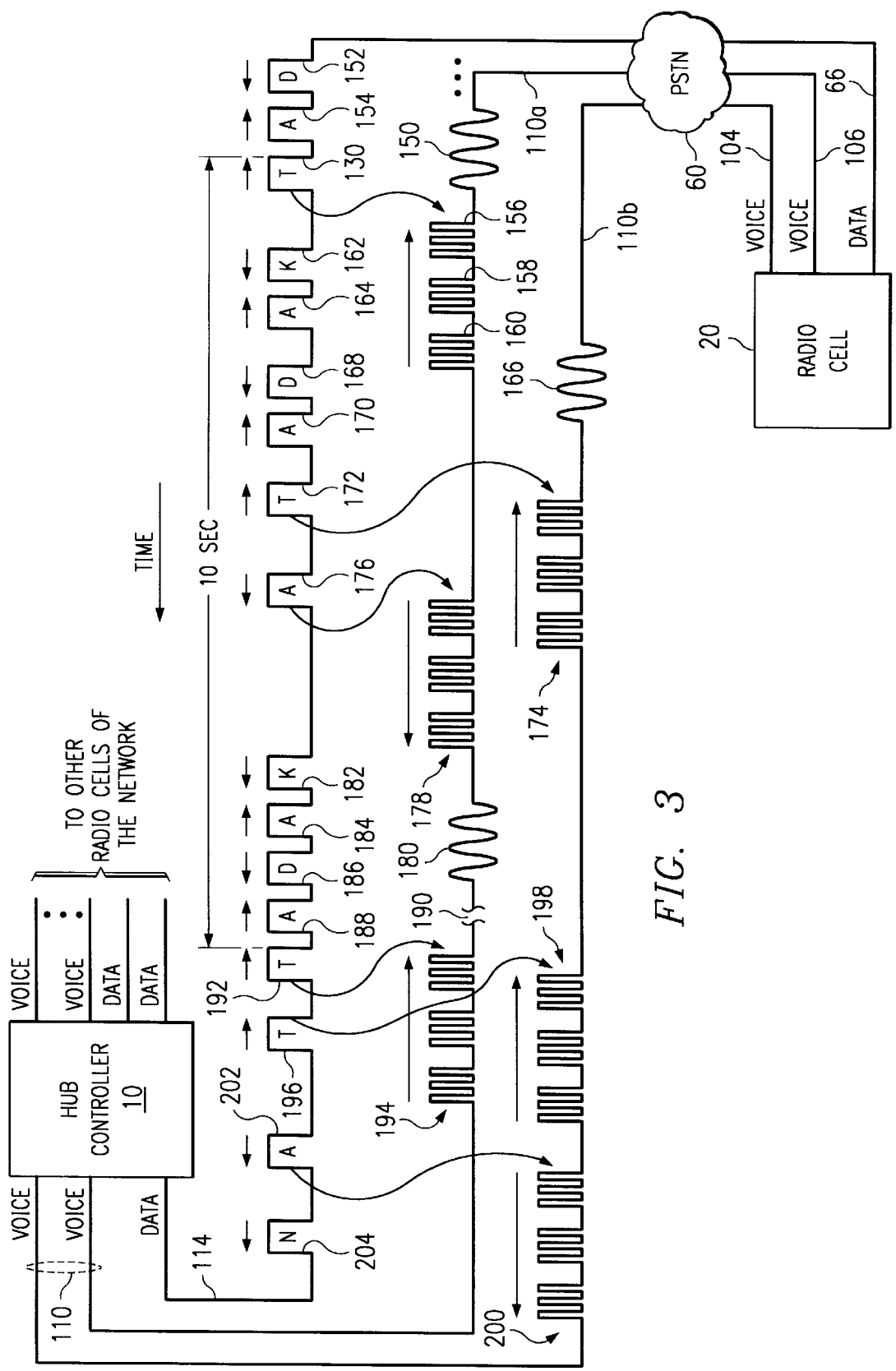
FIG. 3 is a diagram of the communication lines between the hub controller and one radio cell, and the type and direction of the signals carried on the lines.

FIG. 3 illustrates two voice or audio lines and a data line coupled between the hub controller 10 and a radio cell 20, via the PSTN 60. Also shown on the lines are the various signals passed between the hub controller 10 and the radio cell 20 in carrying out the line test function according to a preferred embodiment of the invention. In particular, the pulse-type designations on the data line illustrates the modem transmission of data packets. The arrows directly above the data packets illustrate the direction in which the signals are transmitted on the data line, either by the hub controller 10 or the radio cell 20. In addition, the letter within the data packet illustrates either a key (K) transmission, a dekey (D) transmission, an acknowledgment (A) transmission or a test (T) transmission. The sine wave signals on the voice lines illustrate voice communications, while the pulses with vertical lines illustrate DTMF signals. The arrows above the DTMF signals illustrate the direction in which the DTMF signals are being transmitted. For purposes of convenience and clarity, the signals at the far right of FIG. 3 occur first in time, while the signals at the left of FIG. 3 occur later in time. The timing and time periods are not shown to scale.

For the purposes of describing the operation of the invention, it is assumed that a dispatch-type of conversation has been set up and is occurring on the voice line $111_a$, as shown by the sine wave designated by reference numeral 150. Once the voice signals have terminated and the user's transceiver has been dekeyed, as shown by data packet 152, the hub controller 10 responds by an acknowledgment data packet 154. The hub controller 10 then idles the telephone voice line $110_a$.

In accordance with an important feature of the invention, and at periodic times, such as about every ten second interval, the data and audio lines are tested by the hub controller 10. The test is initiated by the transmission of a test data packet 130 from the hub controller 10 to the radio cell 20. The test data packet 130 follows a dekey acknowledgment data packet 154 as closely as possible to test the telephone lines during the idle period. Since the hub controller 10 is programmed to assign the various voice lines during dispatch communications, a particular idle voice line to be tested is maintained in an idle state by the hub controller 10. The transmission of the audio test data packet 130 (FIG. 2) includes an audio test command, an identification of the particular telephone line to be tested in the line index field 142, and a unique identifier in the correlator field 144 that identifies the radio cell 20. Substantially immediately following the transmission of the audio test data packet 130, the hub controller 10 causes three DTMF digits to be transmitted on audio line 110$_a$. In the preferred form of the invention, the first DTMF digit 156 comprises the numeral one, the second DTMF digit 158 is the numeral 2 and the third DTMF digit 160 is the pound sign (#). These particular digits are selected so that a variation in audio frequencies is transmitted over the voice lines. Those skilled in the art understand that the DTMF digit one is comprised of the dual frequencies of 697 and 1209 Hz, the numeral two is comprised of the frequencies of 697 and 1336 Hz, and the pound sign is comprised of the frequencies of 941 and 1447 Hz. During the transmission of the DTMF signals 156–160 on voice line 110$_a$, according to the example of FIG. 3, a user associated with radio cell 20 keys a transmitter, as shown by data packet 162. The hub controller 10 receives the key data packet 162 and sends an acknowledgment of the same, as noted by data packet 164. While not shown, the hub controller 10 also communicates other data packets to the radio cell to identify which audio line is to be used for dispatch communications, and in this example audio or voice line 110$_b$ is selected. The voice signals 166 are shown to be carried on the voice line 110$_b$ as a result of the transceiver being keyed and the transmission of the key data packet 162. Once the dispatched communication is terminated, the transceiver releases the key and a dekey data packet 168 is transmitted, in which event the hub controller 10 acknowledges the same by the transmission of an acknowledgment data packet 170. In view that the hub controller 10 is involved in a period in which line tests are carried out, a second audio test data packet 172 is transmitted to the radio cell 20. In such data packet, the telephone voice line 110$_b$ is idle and is thus selected by the hub controller 10 to carry out the line test by the transmission of three DTMF digits 174 on voice line 110$_b$.

If indeed both the data line 114 and the voice line 110$_a$ are off-hook and operable, the radio cell 20 will receive the first audio test data packet 130 as well as the corresponding DTMF digits 156–160. On receipt of the first test data packet 130 and the DTME signals 156–160, the radio cell 20 will transmit on the data line 114 an audio test acknowledgement data packet 176. Moreover, the DTMF digits 156–160 are received by the radio cell 20 and decoded to corresponding digits. The radio cell 20 then transmits on the voice line 110$_a$ the same set of DTMF digits 178. While these DTMF signals can be other numerals, the radio cell 20 is programmed to transmit the same numerals, in the same order as received on the voice line 110$_a$. In the example, the radio cell 20 will transmit a first DTMF digit corresponding to the numeral one, and the subsequent two digits corresponding to the numerals two and #. While these particular digits are selected in accordance with a preferred form of the invention, those skilled in the art may prefer to transmit all combinations of the DTMF signals to verify that both DTMF transmitters and receivers function properly for all ten digits and both symbols on a twelve-button keypad. Yet others may prefer to transmit frequencies or signals other than the DTMF signals to achieve yet other advantages or features.

During testing of the lines, other dispatch communications may be allowed, such as that shown by the sine wave 180 on line 110$_a$, corresponding to the key and acknowledgment data packets 182 and 184. Again, the dekey data packet 186 and the dekey acknowledgment data packet 188 follow the termination of the dispatched communication 180.

In the example, the discontinuity 190 shown in voice line 110$_a$ occurs after the dispatch communication 180, but before the hub controller 10 receives the retransmitted DTMF tones 178. The discontinuity 190 can appear such as an on-hook condition inadvertently occurring as a result of the unreliable operation of the PSTN 60. Since the DTMF signals 178 are shown to have been transmitted on the voice line 110$_a$ at a time before the occurrence of the discontinuity 190, such DTMF signals are presumed to have reached the hub controller 10. If the hub controller correctly decodes the DTMF signals and compares the digits with those transmitted, it is confirmed that the data line 114 is operable for carrying bidirectional data packets. In addition, it is also confirmed by the hub controller 10 that the audio line 110$_a$ is operable to carry bidirectional audio signals, at least before the time at which the discontinuity 190 occurred.

After a voice line 110$_a$ has gone on-hook inadvertently and is thus inoperable to carry voice signals, the hub controller 10 initiates another cycle of line tests by transmitting an audio line test data packet 192, due to the expiration of the ten-second periodic interval. Again, a ten-second interval is arbitrarily chosen and can be various other time periods. It is apparent that the time period between tests of the associated audio and data lines will be related to the reliability of the PSTN 60 and other equipment. For example, highly unreliable systems would be tested more frequently, and more reliable systems and equipment can be tested less frequently and thereby allow a higher capacity of dispatch communications without making the lines idle for the audio line tests. The audio test data packet 192 of the test cycle is immediately followed by the three DTMF digits 194 transmitted on line 110$_a$. Since the voice line 110$_b$ is also idle, a second audio line test data packet 196 is transmitted by the hub controller 10 to radio cell 20, whereupon corresponding DTME signals 198 are transmitted on the other voice line 110$_b$. When the radio cell 20 correctly receives the DTMF signals 198 on voiceline 110$_b$ and decodes the same, return DTMF signals 200 are transmitted on the voice line 110$_b$, as is an acknowledgment data packet 202 transmitted on the data line 114.

As noted above, the discontinuity 190 in the voice line 110$_a$ occurred in time before the transmission by the hub controller 10 of the DTMF signals 194 on line 110$_a$. Hence, the radio cell 20 received the audio test data packet 192 on data line 114, but did not receive the corresponding DTMF signals 194 on the voice line 110$_a$. As a result, the radio cell 20 waits for a predefined period of time after receipt of the audio test data packet 192, and if no corresponding DTMF signals are received, an audio test negative acknowledgment data packet 204 is transmitted. The negative acknowledgment data packet 204 indicates that the data line 114 is operable, since test and negative acknowledgment data packets were respectively transmitted and received on such line.

In response to the negative acknowledgment data packet 204, the hub controller 10 initiates the reestablishment of the voice line 110$_a$. This is accomplished by transmitting an initialization data packet to the radio cell 20, whereupon the radio cell 20 places the voice line 106 on-hook, and then off-hook, and dials the directory number associated with such line. The procedures for initiating and reestablishing a voice line are set forth in more detail in the above-identified pending patent application. In any event, when the voice line 110$_a$ is reestablished between the hub controller 10 and the radio cell 20, dispatch communications can be carried on such line, as well as audio line tests to verify that the line remains off-hook.

There are occasions when the discontinuity 190 in the line does not prevent bidirectional communications, but rather allows communications in one direction, such as from the hub controller 10 to the radio cell 20. This type of malfunction may be attributable to a defective hybrid network in the voice line, or other dysfunctional circuits. In any event, it is possible under certain circumstances that both the audio test data packet 196 as well as the corresponding DTMF signals 194 are received by the radio cell 20. In this event, the radio cell 20 will transmit in return an acknowledgment data packet (not shown) and a corresponding set of return DTMF signals. However, in this instance, due to the dysfunctional unidirectional characteristic of the audio line, the DTMF signals may not be transmittable back to the hub controller 10 on the line $110_a$. In this event, the hub controller 10 can receive an acknowledgment data packet from the radio cell 20, but not corresponding DTMF signals. Because of this combination of signals received and not received, it can be ascertained that the voice line $110_a$, is capable only of unidirectional transmission of signals. Again, the hub controller 10 is programmed to communicate with the radio cell 20 to reestablish a bidirectional communication on the voice line $110_a$. This occurs in the same manner, namely, by transmitting an initialization data packet where the radio cell 20 again goes on-hook, and off-hook to dial the directory number of the line.

While not shown in FIG. 3, other situations may exist in which the data line 114 itself is inoperable. In this event, the hub controller 10 will transmit an audio test data packet 130, followed by appropriate DTMF signals. The radio cell 20 will not receive the data packet if the data line 114 is inoperable, but will receive the DTMF signals. In this event, the radio cell 20 is programmed to transmit on the data line 66 a negative acknowledgment data packet. In all probability, if the data line 114 is defective or on-hook, the return data packet acknowledgment will not be received by the hub controller 10. On the other hand, if the data line 114 is only capable of unidirectional transmission, the hub controller 10 may receive the audio test nak data packet. However, since the radio cell 20 did not receive the audio test data packet, it would not have sufficient information to determine which audio line is being tested, and thus the radio cell 20 does not transmit any return DTMF signals.

In the event a data line 114 is found by the hub controller 10 to be defective or on-hook, initialization procedures are again instituted by the hub controller 10. However, in the event a data line 114 is to be reestablished, then all of the corresponding audio lines are placed on-hook so that the entire radio cell 20 can be reinitialized. The system reinitialization procedures are set forth in detail in the pending patent application identified above.

In accordance with the preferred embodiment of the invention, the transmission of a routine data packet takes about 37.5 milliseconds. The transmission of each DTMF digit, as well as the interdigit delay are each about 100 milliseconds, thereby requiring a total of about 500 milliseconds for the transmission of three DTMF signals. As such, it takes about one-half second to carry out a test of both the data line 114 and one audio line. In accordance with an important feature of the invention, and as noted above, the hub controller 10 is programmed to initiate its test cycle immediately after the transmission of a dekey acknowledgment by the hub controller 10. With this arrangement, no more than a single dispatch communication will be lost due to either the data line 114 or a voice line going on-hook.

From the foregoing, it is noted that the audio line test is carried out in response to either of two events. An audio line test is carried out immediately after each dekey data packet received by the hub controller 10. An audio line test is also carried out on each voice line every ten seconds, for example. The processor 118 in the hub controller 10 can be programmed with a software timer to carry out the audio line tests after the expiration of the predefined period of time when the timer interrupts the processor 118. The testing of the voice lines begins by idling the lines after the dispatch communications, and testing each line, one after the other in a round robin manner. Lines found to be defective can be either reinitialized and again placed off hook, or can be removed from service if found to be defective.

In order to prevent the spurious operation of the communications line tests, the processor 118 in the hub controller 10 and the processor in the radio cells can each be programmed to respond to each other during various time windows. For example, after the radio cell receives an audio test data packet 130, it can enable its DTMF receivers coupled to the line for a specified period of time. During this time, which may be for several seconds, the radio cell waits for receipt of the test DTMF signals transmitted on the line by the hub controller 10. This prevents the radio cell from responding to spurious audio signals that may appear on the audio line during time periods outside the programmed time window. In like manner, the hub controller 10 can be programmed to enable DTMF receivers coupled to the line under test for predefined periods of time after receiving the audio test acknowledgment data packet from the radio cell. Many other precautions can be taken to assure the reliability of the communication line test set forth above.

While the foregoing is described in connection with the bidirectional transmission of data packets as well as DTMF tones, those skilled in the art may prefer other arrangements or combinations for testing communication lines. For example, the system can be programmed so that the hub controller 10 only sends out an audio test data packet and no DTMF tones, while the radio cell 20 only transmits a return DTMF signal, and no data packets. Alternatively, the hub controller 10 can be configured to send an audio test data packet followed by the DTMF tones, and the radio cell 20 need only transmit back a data packet acknowledgment on the data line. Various other combinations of data packets and signals can be transmitted between the hub controller 10 and the radio cell 20 in order to assure integrity of the communication lines.

It should also be understood that the principles and concepts of the invention can be applied to many other types of communication systems, other than the mobile radio type. Also, communication lines can be tested from an origin to a destination using lines other than analog telephone lines, such as digital lines and the like.

While the preferred embodiment and the method and apparatus have been disclosed with reference to a specific radio cell, hub controller and communication connections therebetween, it is to be understood that many changes in detail may be made as a matter of engineering choices without departing from the scope of the invention as defined by the appended claims. Indeed, those skilled in the art may prefer to embody the apparatus in other forms, and in light of the present description, they will find it easy to implement that choice. Also, it is not necessary to adopt all of the various advantages or features of the present disclosure into a single composite networked arrangement to realize the individual advantages.

what is claimed is:

1. In a telecommunication system of the type having a line carrying information between an origin and a destination and a data line between said origin and said destination, a method of testing the line to assure connection of the line between the origin and the destination, comprising the steps of:

establishing said data line by dialing a telephone number associated with the data line;

transmitting data on said data line from the origin to the destination to identify initiation of a test of the line;

periodically transmitting a first signal having predefined characteristics on said line from the origin to the destination;

in response by said destination to receipt of said first signal, transmitting on said line by said destination a second signal having predefined characteristics; and receiving by said origin said second signal to thereby verify that said line can carry signals in a bidirectional manner.

2. The method of claim 1, wherein said first signal comprises a plurality of DTMF signals, each of said plurality of DTMF signals corresponding to a predefined digit.

3. The method of claim 1, further including the step of establishing said line as a dial-up telephone line by dialing a telephone number associated with the line, whereby said line is connected from the origin to the destination via a telephone switching system.

4. The method of claim 1, further including the step of transmitting by the destination on the data line, data for acknowledging the initiation of the test.

5. The method of claim 1, further including the step of testing a plurality of said lines connected between the origin and the destination using one said data line.

6. The method of claim 1, said telecommunication system further including a plurality of destinations connected to said origin via corresponding lines, further including the step of bridging together at said origin at least two of said lines associated with respective destinations.

7. The method of claim 6, further including the step of bridging together three or more lines to thereby place three or more of said plurality of destinations in communication together.

8. The method of claim 1, wherein said testing is carried out immediately after each communication carried by said line.

9. The method of claim 6, further including carrying out testing on each line in a round-robin manner.

10. A communication network for providing dispatch type of communications, comprising:

a plurality of radio cells adapted for providing radio communications between plural transceivers;

a hub controller coupled to each of said plurality of radio cells by a data line and one or more voice lines via a public switched telephone network;

said hub controller having a program controlled processor, a modem coupled to said data lines and a DTMF transmitter/receiver coupled to the voice lines;

said hub controller being programmed to carry out a test of the voice lines by controlling said modem to transmit data to one of said plurality of radio cells, said data identifying one of said one or more voice lines to be tested, to control said DTMF transmitter/receiver to transmit a DTMF signal on the one of said one or more voice lines to be tested, and to control said DTMF transmitter/receiver to receive a DTMF signal on the one of said one or more voice lines to be tested;

one of said plurality of radio cells including:

a program controlled processor;

data receiver for receiving data on said data line; and a DTMF transmitter/receiver coupled to said one of said one or more voice lines;

said one of said plurality of radio cells being programmed to receive data on the data line, to decode said data, to determine the one of said one or more voice lines to be tested, to couple said DTMF transmitter/receiver of the one of said plurality of radio cells to the one of said one or more voice lines to be tested, to identify the DTMF signal received by said DTMF transmitter/receiver coupled to said one of said one or more voice lines, and to cause the DTMF signal to be transmitted on the one of said one or more voice lines to be tested.

11. The communication network of claim 10, wherein said hub controller is programmed to compare the DTMF signal transmitted on the one of said one or more voice lines to be tested with the DTMF signal received on the one of said one or more voice lines to be tested.

12. In a telecommunication system of the type having a plurality of lines carrying information between an origin and a corresponding plurality of destinations, a method of testing said plurality of lines to assure connection of a line between said origin and a corresponding destination, comprising the steps of:

bridging together at said origin at least two of said lines associated with respective destinations;

transmitting a first signal having predefined characteristics on said line from said origin to said destination;

in response by said destination to receipt of said first signal, transmitting on said line by said destination a second signal having predefined characteristics; and receiving by said origin said second signal to thereby verify that said line can carry signals in a bidirectional manner.

13. The method of claim 12, further including the step of bridging together three or more lines to thereby place three or more of said plurality of destinations in communication together.

14. A communication system for providing dispatch type of communications, comprising:

a hub controller;

a plurality of switching systems connected to said hub controller by respective audio line and data lines;

a switch to bridge said respective audio lines together; and said hub controller being programmed to periodically carry out a test on said data lines and said audio lines by transmitting a data packet on said data lines, said data packet identifying an initiation of said test, and transmitting an audio tone on said audio lines.

* * * * *

UNITED STATES PATENT AND TRADEMARK OFFICE
CERTIFICATE OF CORRECTION

PATENT NO.    : 6,195,415 B1
DATED         : February 27, 2001
INVENTOR(S)   : Makoto Shimoda et al.

It is certified that error appears in the above-identified patent and that said Letters Patent is hereby corrected as shown below:

Column 4,
Line 27, after "network", insert -- (PSTN) --.

Column 5,
Line 10, after "line", insert -- 66-72 --.
Line 24, after "lines", insert -- 114 --.

Column 7,
Line 36, after "network", insert -- 60 --.
Line 62, delete "programmed", and insert -- program-controlled --.

Column 8,
Line 8, after "command", insert -- field --.
Line 10, after "command", insert -- data --.
Line 12, after "packet", insert -- 130 --.

Column 10,
Line 7, after "signals", insert -- 178 --.
Line 9, after "signals", insert -- 178 --.

Signed and Sealed this

Thirteenth Day of August, 2002

Attest:

JAMES E. ROGAN
Attesting Officer     Director of the United States Patent and Trademark Office